(12) United States Patent
Chester

(10) Patent No.: US 7,664,143 B2
(45) Date of Patent: Feb. 16, 2010

(54) COMMUNICATIONS SYSTEM USING ADAPTIVE BASEBAND INJECTED PILOT CARRIER SYMBOLS AND RELATED METHOD

(75) Inventor: David B. Chester, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 374 days.

(21) Appl. No.: 11/742,738

(22) Filed: May 1, 2007

(65) Prior Publication Data

US 2008/0273555 A1 Nov. 6, 2008

(51) Int. Cl.
*H04B 3/10* (2006.01)
*H04J 1/16* (2006.01)
*H04J 3/14* (2006.01)

(52) U.S. Cl. ........................ 370/500; 370/491

(58) Field of Classification Search ............. 370/500, 370/491, 206, 207, 252, 332, 333, 336, 338, 370/478

See application file for complete search history.

(56) References Cited

U.S. PATENT DOCUMENTS

| | | | |
|---|---|---|---|
| 5,541,955 A | 7/1996 | Jacobsmeyer | 375/222 |
| 5,586,122 A * | 12/1996 | Suzuki et al. | 370/347 |
| 6,416,471 B1 * | 7/2002 | Kumar et al. | 600/300 |
| 6,535,502 B1 * | 3/2003 | Brink | 370/345 |
| 6,606,357 B1 | 8/2003 | Cobb et al. | 375/281 |
| 7,298,721 B2 * | 11/2007 | Atarashi et al. | 370/335 |
| 7,436,757 B1 * | 10/2008 | Wilson et al. | 370/203 |
| 2005/0207335 A1 * | 9/2005 | Schmidl et al. | 370/206 |
| 2006/0045001 A1 * | 3/2006 | Jalali | 370/208 |
| 2006/0056305 A1 * | 3/2006 | Oksman et al. | 370/252 |
| 2006/0209883 A1 * | 9/2006 | Suzuki | 370/465 |
| 2007/0041404 A1 * | 2/2007 | Palanki et al. | 370/479 |
| 2007/0064618 A1 * | 3/2007 | Garcia et al. | 370/252 |
| 2007/0096788 A1 * | 5/2007 | Thesling | 327/284 |
| 2007/0165526 A1 * | 7/2007 | Lee | 370/230 |
| 2007/0263529 A1 * | 11/2007 | Ishikura et al. | 370/211 |

* cited by examiner

*Primary Examiner*—Brian D Nguyen
(74) *Attorney, Agent, or Firm*—Allen, Dyer, Doppelt, Milbrath & Gilchrist, P.A.

(57) ABSTRACT

A system, method and apparatus includes a transmitter that has an encoder and baseband modulator that encodes and modulates a sequence of payload data symbols as a signal constellation to be communicated. An amble generator and baseband modulator generates amble symbols as a known sequence of M symbol times in length every N symbol times. A multiplexer multiplexes the data and amble symbols together to form a communications signal that is transmitted over a communications channel.

28 Claims, 5 Drawing Sheets

COMMUNICATIONS SYSTEM USING ADAPTIVE BASEBAND INJECTED PILOT CARRIER SYMBOLS AND RELATED METHOD

FIELD OF THE INVENTION

The present invention relates to communication systems, and more particularly, the present invention relates to pilot carriers used in communication systems.

BACKGROUND OF THE INVENTION

It is standard practice in adaptive rate communication systems, e.g., IEEE 802.11 systems, to monitor some performance metric, for example, the received SNR (Signal-to-Noise Ratio), BER (Bit Error Rate), PER (Packet Error Rate) or similar performance metrics. Based on these measured results, the system adjusts symbol rates to provide some minimum acceptable level of performance. The symbol rates typically have rational relationships to each other to minimize system complexity. In some systems using rate adaptation, rate transitions are performed in abrupt steps by changing modulation types or modes.

Some current systems monitor a performance metric and compare a derivative form of the metric to an upper or lower threshold. If the derivative rises above an upper threshold, information throughput is raised either by increasing the symbol rate of the system, changing the modulation technique or mode, or a combination of the two. If the derivative degrades to below a lower threshold, however, information throughput is lowered by decreasing the symbol rate of the system, changing the modulation technique or mode, or a combination of the two. These current techniques require instantiations of multiple modulators and demodulators in a single modem and force discontinuous information rates as a function of error metric values.

Adaptive rate modems are commonly used in the industry. An example of an adaptive rate modem is disclosed in U.S. Pat. No. 5,541,955 to Jacobsmeyer. This modem uses soft decision metrics to provide an estimate of the signal-to-noise ratio and predicts a future signal-to-noise ratio to determine the desired data rate for the modem.

It is possible to use a pilot carrier in similar systems. For example, baseband injected pilot carriers are often used in communication systems to enhance the performance of required operations in a high performance modem. An example of such system is disclosed in commonly assigned U.S. Pat. No. 6,606,357, the disclosure which is hereby incorporated by reference in its entirety. The '357 patent discloses a QPSK modulation scheme that uses a data spreading mechanism to take a relatively limited portion of the available transmitter power and inject into the QPSK waveform a prescribed amount of carrier signal power. Detection and non-regenerative extraction of the carrier at the receiver can be achieved without incurring a signal-to-noise degradation penalty. This injected, carrier based modulation scheme can use high performance, forward error correction (FEC) coding to reduce the signal power required for achieving a low energy per bit-to-noise density ratio ($E_b/N_o$) on the order of 1 to about 0 dB. It is possible that performance enhancements could be applied to this baseband injected pilot carrier system using adaptive techniques.

SUMMARY OF THE INVENTION

A system, method and apparatus includes a transmitter that has an encoder and baseband modulator that encodes and modulates a sequence of payload data symbols as a signal constellation to be communicated. An amble generator and baseband modulator generates amble symbols as a known sequence of M symbol times in length every N symbol times. A multiplexer multiplexes the data and amble symbols together to form a communications signal that is transmitted over a communications channel.

A receiver receives the communication signal and separates the data symbols from the amble symbols and determines performance metrics such that the transmitter either increases or decreases at least one of the length of the amble or frequency of ambles to bring a performance metric above or below a threshold without changing a symbol rate.

A multiplexer can be formed as a time division multiplexer for time multiplexing the data and amble symbols together. The amble symbols can be formed either with a different modulation format than the data symbols or a subset of the data symbols. The duration of an amble symbol can be the same as a data symbol. The transmitter could be operative for transmitting the communications signal such that at the beginning of a transmission of an M symbol sequence, the first N symbols are amble symbols and the remaining M-N symbols are data symbols.

A control channel can exist between the transmitter and receiver and be formed orthogonal to the communications channel. The receiver could also include an amble generator for generating a local version of the amble symbols and comparing with received amble symbols to determine performance metrics of the communications channel.

An apparatus and method is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

As described in the incorporated by reference '357 patent, baseband injected pilot carrier (BIPC) symbols are grouped into appropriate baseband injected pilot carrier ambles, These symbols can be viewed as a known training sequence of a M symbol times in length transmitted every N symbol times. In typical implementations, M and N are fixed.

In accordance with a non-limiting example of the present invention, the application of the adaptive baseband injected pilot carrier to symbols in changing channel environments facilitates graceful rate degradation, maximum data rates for a given modulation type and interference environment, and a reduced requirement for a large number of modulation types to facilitate a plurality of data rates.

Just as some traditional systems require changes in symbol rates based on monitoring error performance metrics, graceful degradation of throughput can be accomplished by using these same error metrics to adaptively modify the baseband injected pilot carrier symbol amble characteristics and change error performance and throughput in a much more graduated fashion.

For a selected performance metric, as the metric degrades, either the length of the amble, the frequency of ambles or both are increased to bring the performance metric to above a given threshold. If the performance metric increases to above this threshold, either the length of the amble, the frequency of ambles or both are decreased to bring the performance metric to just above a given threshold. The net result is a more continuous adjustment in throughput without changing the symbol rate.

Negotiation of symbol rate requires some handshaking protocol to allow the transmitter and receiver to interoperate. System transition between one symbol rate and another requires overhead, which degrades actual information throughput. An adaptive amble baseband injected pilot carrier could be used in tandem with or independent of the symbol rate adaptation and provide a continuously variable and low overhead throughput rate.

In a hybrid system, if a diminishing return is reached when adapting the ambles, the symbol rate can change and the amble parameters can be reset to begin a new iteration.

Figure 1:
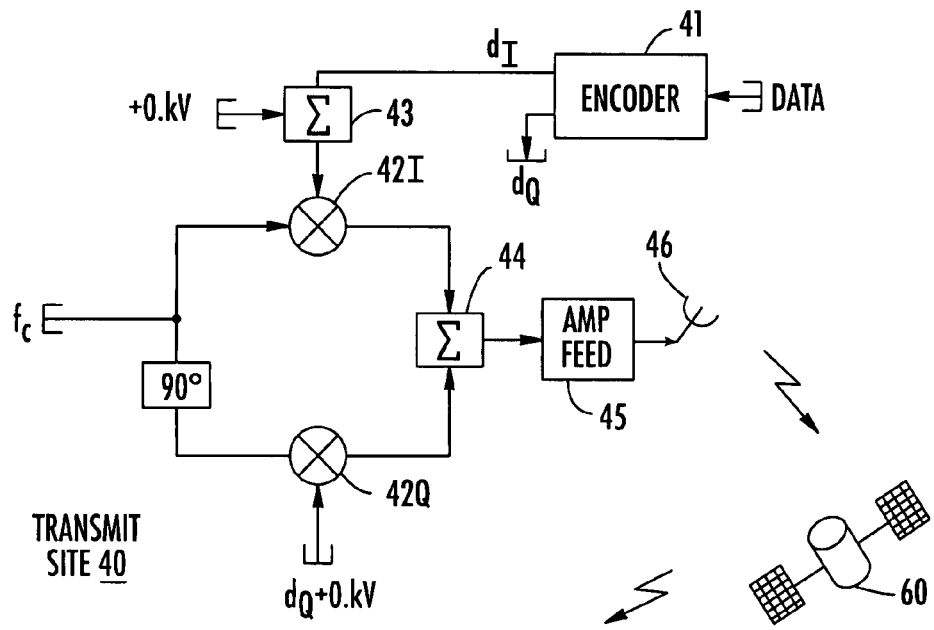
FIG. 1 is a prior art block diagram illustrating a QPSK-based satellite communication system that uses a carrier-injecting modulation scheme as disclosed in the above-identified '357 patent.
Figure 1:
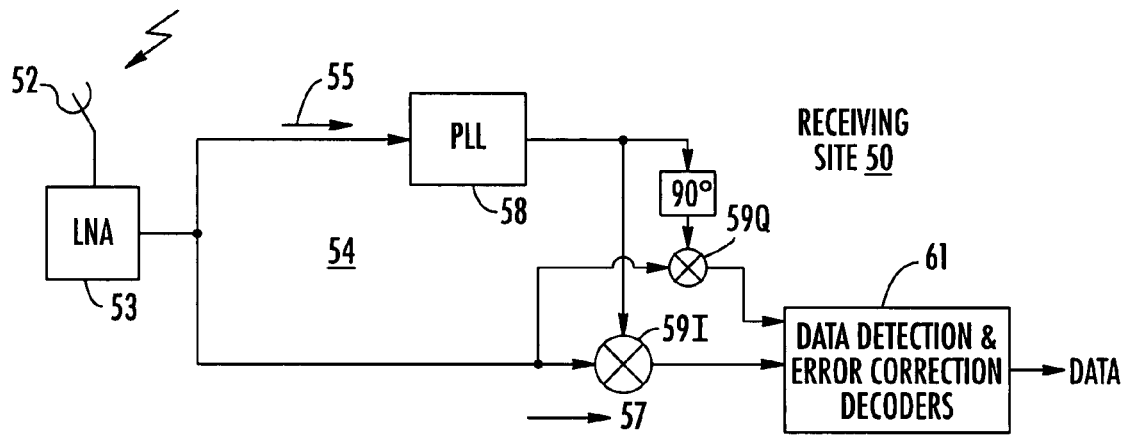
Figure 2:
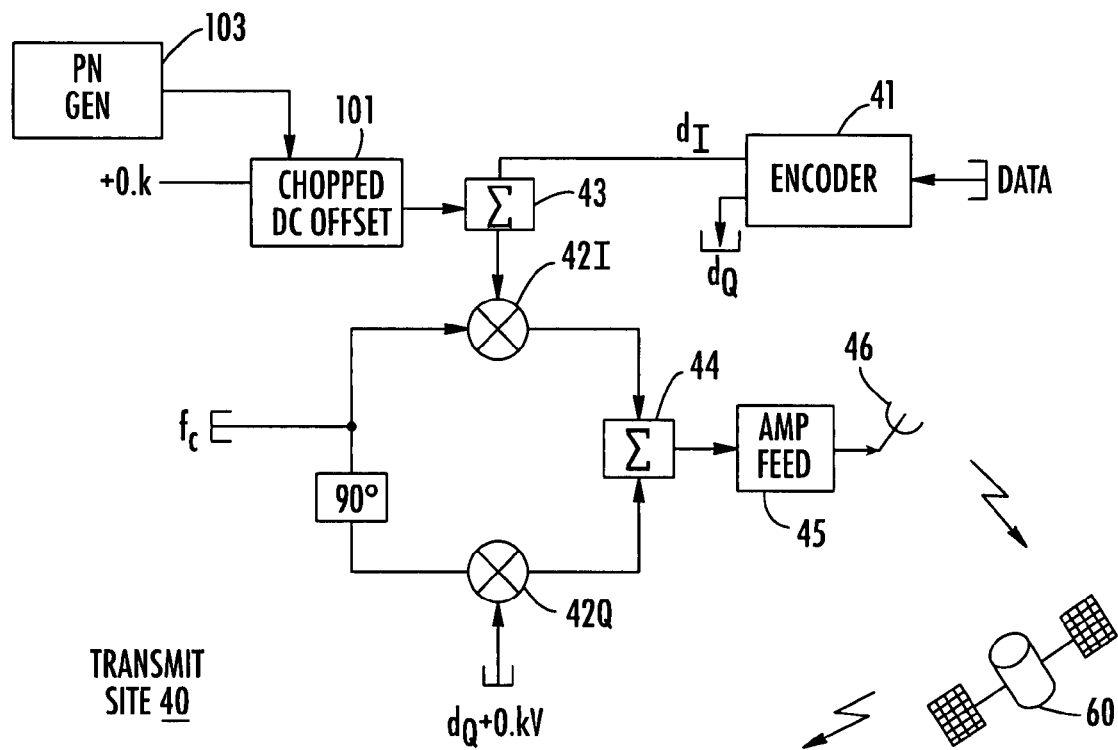
FIGS. 2 and 3 are block diagrams that illustrate a prior art QPSK-based satellite communication system having a carrier-injecting modulation and demodulation scheme in accordance with another embodiment described in the above-identified '357 patent.
Figure 2:
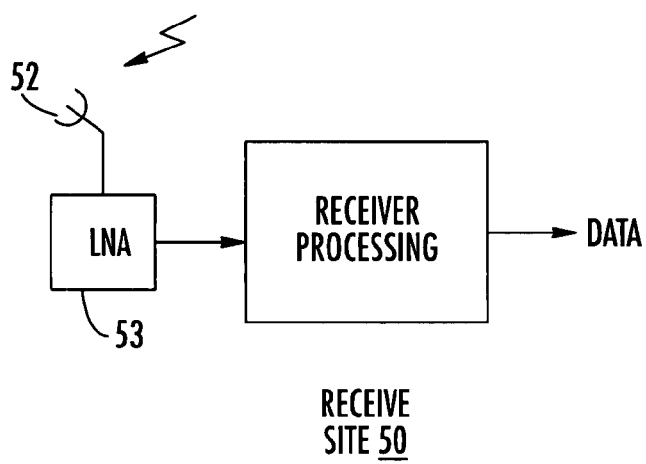
Figure 3:
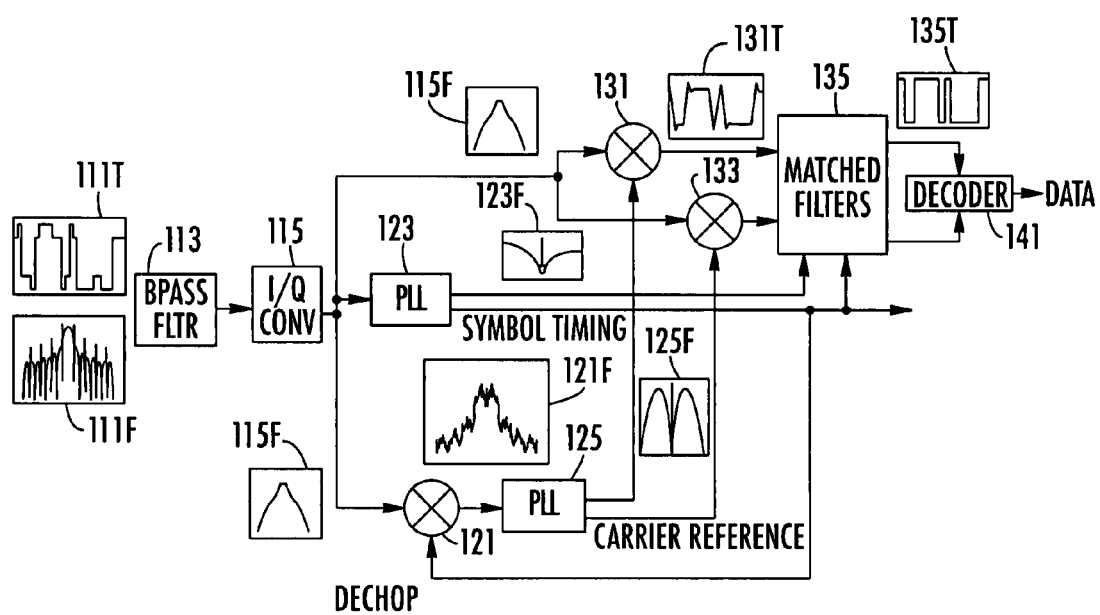
Figure 4:
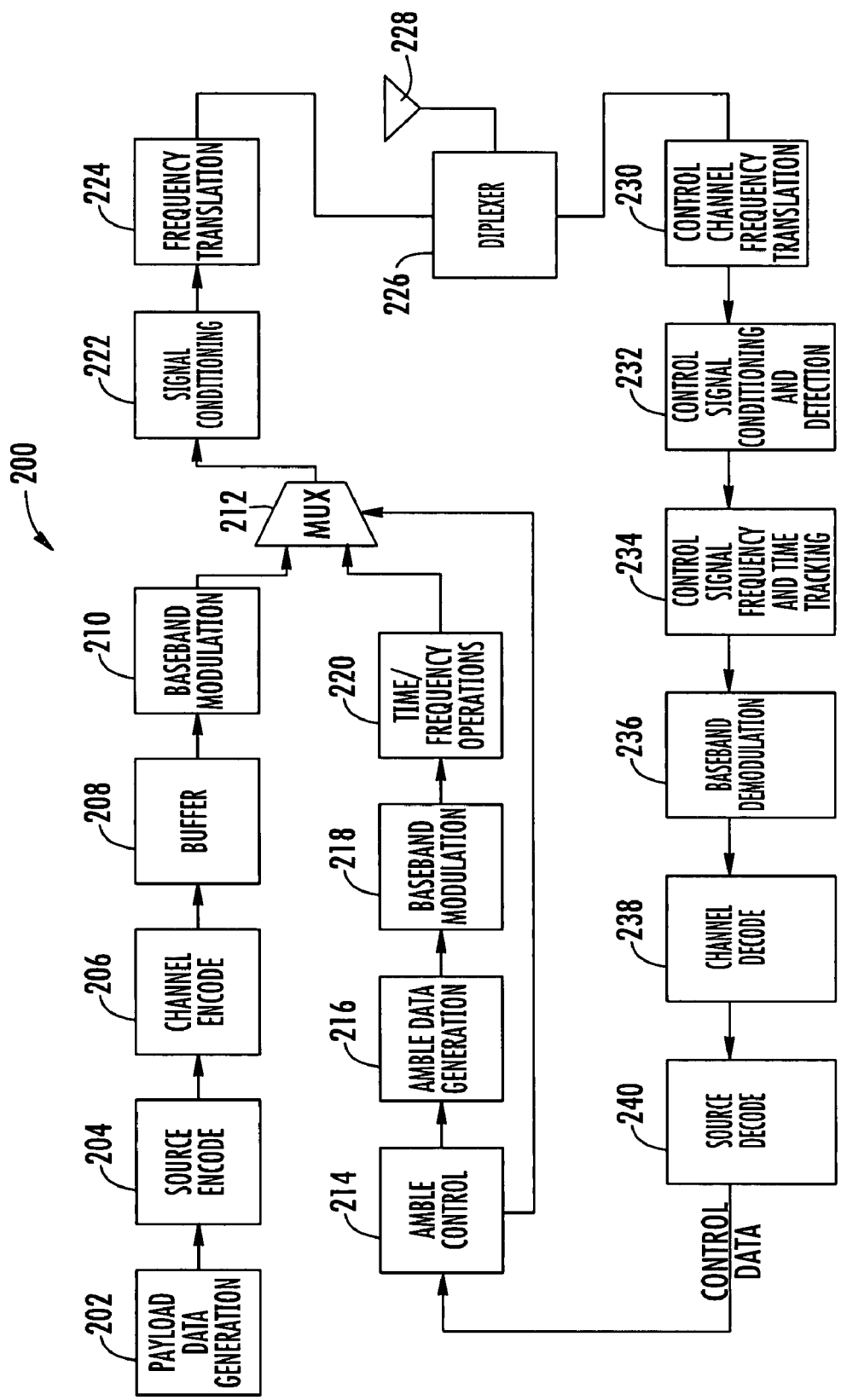
FIG. 4 is a block diagram of a transmitter that uses adaptive baseband injected pilot carrier symbols in accordance with a non-limiting example of the present invention.
Figure 5:
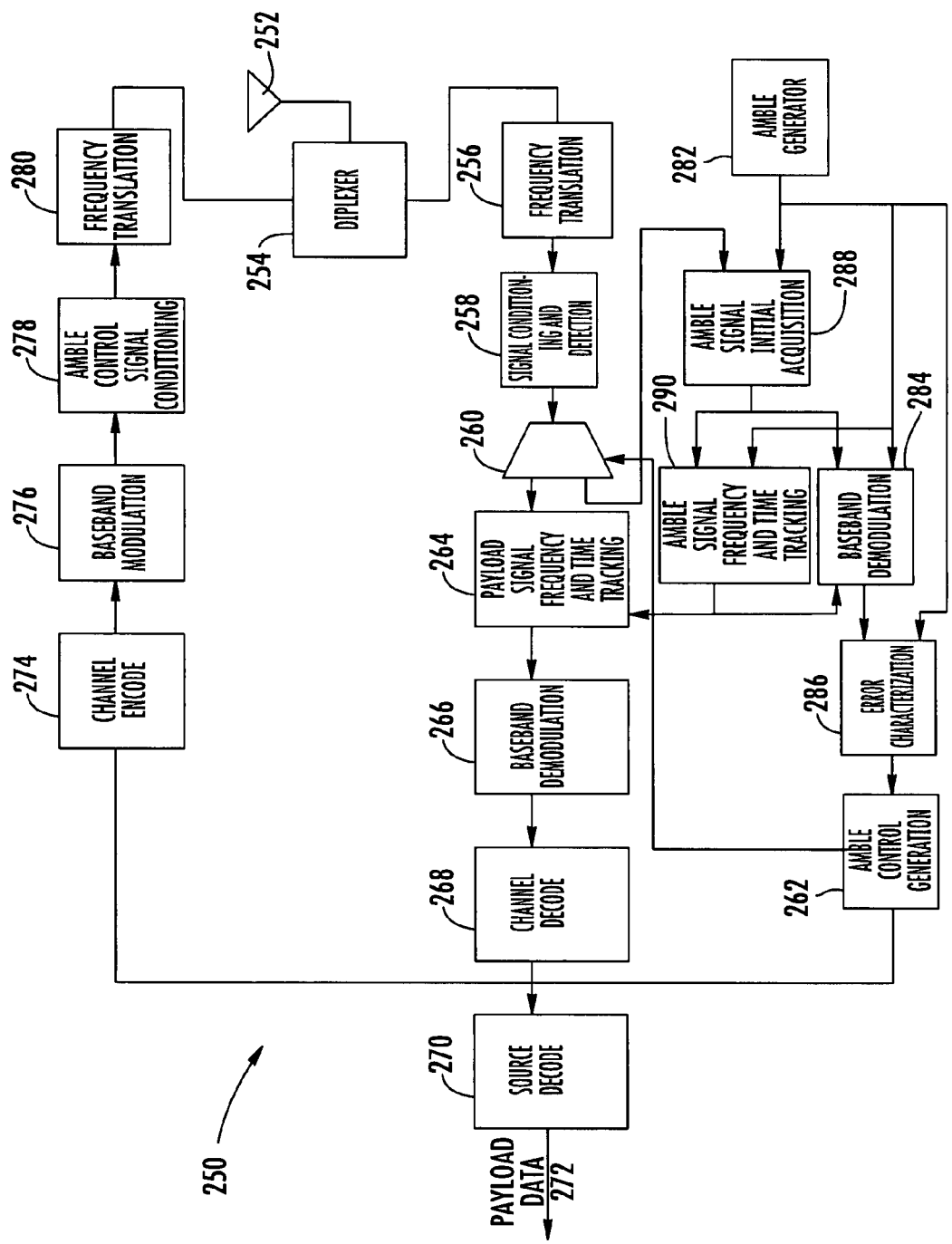
FIG. 5 is a block diagram of a receiver that receives and processes the adaptive baseband injected pilot carrier symbols in accordance with a non-limiting example of the present invention.

For purposes of description and background, the prior art baseband injected pilot carrier system disclosed in the above-identified '357 patent is described relative to FIGS. 1-3, followed by a detailed description of the use of baseband injected pilot carrier symbols with graceful degradation relative to FIGS. 4 and 5, in accordance with a non-limiting example of the present invention.

As shown in FIG. 1, a conventional QPSK modulation process injects into a resultant QPSK waveform a prescribed amount of carrier energy, which serves to facilitate detection and recovery (rather than non-linear regeneration) of the carrier at the receiver. That injected carrier-based modulation scheme may exploit high performance forward error correction (FEC) coding schemes to reduce significantly the signal power required for achieving a desired bit error probability.

Respective earth stations 40 and 50 are linked by a satellite transponder 60. Earth station 40 corresponds to a transmit site and earth station 50 corresponds to a receive site.

At the transmit site 40, in-phase (I) channel and quadrature-phase (Q) channel data symbols $d_I$ and $d_Q$ are encoded in an encoder 41 with a prescribed forward error correction code, such as a high performance code (e.g., a turbo, as a non-limiting example), and coupled to associated mixers 42I and 42Q, to which a carrier signal $f_C$ is also applied. The encoded data symbol streams are typically defined as excursions between prescribed voltage levels as respective normalized values of +1.0 volts and −1.0 volts. In addition, the data signal path of one of the channels is summed with a prescribed D.C. voltage level to provide an offset from the ideal normalized value.

A summing unit 43 is installed in the in-phase data signal path to which a voltage offset of +0.k volts is applied. The insertion of this DC offset voltage shifts or biases the reference levels for the encoded in-phase data symbol stream to values of 1.k volts and (−1.0+0.k volts). The resultant phase quadrature modulated signals produced by mixers 42I and 42Q are then summed in a summing unit 44 to produce a composite QPSK signal, which is transmitted via amplifier-feed circuitry 45 coupled to an antenna 46.

At the receive site 50, signals received by an antenna 52 and associated low noise amplifier circuitry 53 are coupled to a single demodulator loop, which is shown at 58 as a phase locked loop. To demodulate the data, the received signal is coupled to a carrier recovery path 55 and a data recovery path 57. Since a prescribed amount of discrete carrier energy is contained in the transmitted QPSK waveform, that carrier may be readily extracted by a phase locked loop 58, without the need for an upstream signal to noise degrading nonlinear carrier regenerator circuit. The data recovery path 55 includes a pair of phase detectors 59I/Q, to which the received I/Q channel data plus carrier and the extracted carrier signals are supplied. The output of the phase detector 59I/Q represents the encoded data symbols, which are detected using matched filters and are applied to data detection and error correction recovery circuitry 61 to recover the original data.

FIGS. 2 and 3 show a "spread" carrier, that is functionally equivalent to that achieved by the direct insertion of a DC offset or bias voltage, which is injected into the QPSK waveform, by replacing the fixed DC offset voltage feed to the summing unit 43 with a chopped or spread DC offset 101, which is produced by controllably gating a +0.k volt offset to the summing unit by means of a "randomizing" or "spreading" square wave pattern, such as one supplied by a pseudo-random noise (PN) generator 103.

To facilitate PN timing recovery in the demodulator, the PN sequence may be relatively short. Manchester or bi-phase coding of the PN sequence, i.e., multiplying the sequence values by an alternate +1/−1 volt signal, guarantees a transition at each mid-symbol. This, in turn, ensures that the carrier and data signals are time-orthogonal. As a consequence, the carrier does not interfere with the data signal except for the small power loss described above. The data bits do not produce phase jitter in the carrier recovery loop.

Because the loss incurred with QPSK is caused by a difference in level between a "1" and a "0," the difference can be made to average to zero over a symbol time by chopping the transmitted carrier with a square wave having values +1 and −1. If the carrier is chopped at the symbol rate, with an edge occurring at mid-bit, for example, the signal level will be averaged within the demodulator matched filter and no degradation will result. This restores the QPSK loss to be the same as for BPSK.

As shown in the demodulator diagram of FIG. 3, recovering the chopped or spread carrier requires a slightly more complex demodulator, since the carrier must be de-chopped or de-spread in order to be recovered. Since the spreading operation is synchronous with symbol timing, however, the same circuitry may be used for both. Just as transmitting a carrier results in simpler carrier recovery hardware, spreading the carrier can result in simpler symbol timing recovery hardware. Time (T) and frequency (F) domain waveforms are shown at various points in the demodulator diagram of FIG. 3.

The received signal shown at 111T and 111F is filtered in a bandpass filter 113, and downconverted to a complex baseband signal in an I/Q downconverter 115, which may comprise quadrature mixer, and A/D converter. The complex baseband signal shown at 115F is coupled to a despreading mixer 121, to which a despreading PN waveform is supplied by a phase locked loop 123, tuned to the symbol rate, so as to produce the carrier signal spectrum 121F. This carrier is filtered using a phase lock loop 125, which provides a coherent carrier reference 125F to each of in-phase channel and quadrature-phase channel mixers 131 and 133, to which the complex baseband signal 115F is applied.

The outputs of the mixers 131 and 133, one of which is shown at 131T, are filtered in a pair of matched filters 135 for optimum detection, as in a conventional demodulator. As a non-limiting example, the matched filter outputs may be quantized to three or more bits to provide a better decoder performance. Optimum performance of the decoder requires accurate quantized decision levels. A coherent automatic gain control (AGC) circuit could possibly be included, i.e., AGC-derived from the reference carrier and provide an accurate AGC and hence quantization levels because of the relatively high signal-to-noise ratio realized by eliminating the non-linear carrier recovery circuit.

Symbol timing for the matched filters 135 shown at 123F is derived by filtering the data component of the chopped spectrum using the phase locked loop 123. The recovered data samples shown at 135T and the symbol clock 123F are coupled to a downstream decoder 141.

Referring now to FIGS. 4 and 5, a detailed description follows of the use of baseband injected pilot carrier symbols for graceful degradation in accordance with a non-limiting example of the present invention.

FIG. 4 illustrates a transmitter 200 that can be used in accordance with a non-limiting example of the present invention. Basic components are illustrated and include in a first processing circuit portion that includes a payload data generation circuit 202, a source encoder 204, channel encoder 206, buffer circuit 208 and a baseband modulation circuit 210 for baseband signal modulation. These signals from this circuit portion are multiplexed in a multiplexer 212 with signals received from another processing circuit portion, which includes an amble control circuit 214, amble data generation circuit 216, baseband modulation circuit 218 and time/frequency operations circuit 220. The multiplexer 212 also receives signals directly from the amble control circuit 214.

Signals from the multiplexer 212 are output to a signal conditioning circuit 222 and frequency translation circuit 224, which outputs signals to a diplexer 226 from which signals are transmitted through an antenna 228. The diplexer 226 also outputs signals through another processing circuit portion to produce control signals into the amble control circuit 214. That circuit chain includes a control channel frequency translation circuit 230, control signal conditioning and detection circuit 232, control signal frequency and time tracking circuit 234, baseband demodulation circuit 236, channel decoder 238 and source decoder 240. From these series-connected components, the control data is output to the amble control circuit 214.

FIG. 5 is a high-level block diagram of a receiver 250 that can be incorporated for the system using adaptive baseband injected pilot carrier symbols for graceful degradation, in accordance with a non-limiting example of the present invention.

An antenna 252 receives signals into a diplexer 254. Frequency translation occurs within circuit 256, followed by signal conditioning and detection in circuit 258. After conditioning and detection, signals are demultiplexed in a demultiplexer 260 with signals as received from an amble control generation circuit 262. Signals from the multiplexer 260 are output to a payload signal frequency and time tracking circuit 264 and demodulated within a baseband demodulator 266. After demodulation, channel decoding 268 occurs followed by source decoding 270 such that the payload data 272 is output.

The diplexer 254 also receives a signal as feedback from another processing circuit portion that receives outputted signals for the amble control generation circuit 262. This circuit portion includes a channel encoder 274, baseband modulator 276, an amble control signal conditioning circuit 278, and frequency translation circuit 280.

An amble generator 282 outputs signals to a baseband demodulator 284 and error characterization circuit 286, which outputs signals to the amble control generation circuit 262. The amble generator 282 also outputs signals to an amble signal initial acquisition circuit 288 and into the amble signal frequency and time tracking circuit 290. These various components are operative with each other, as illustrated.

As illustrated in FIG. 4, payload data can be generated and modulated using techniques known to those skilled in the art. A buffer 208 is included in the circuit portion for payload signal processing, such as components 202-210, to allow input data to be accepted in a temporally uniform manner, even though payload symbols are interspersed with amble symbols. It should be recognized that this buffer could be placed in part of the circuit potion for signal processing where it could be more efficient for a particular instantiation. Likewise, it should be recognized that no buffer is required if the amble is transmitted in a frequency or code orthogonal manner relative to the payload symbols.

In this embodiment, it is assumed that the payload symbols and amble symbols are time multiplexed as illustrated. The amble symbols may have a different modulation format than the payload symbols, or the amble symbol alphabet may be a subset of the payload symbol alphabet. For purposes of explanation, the variables are now defined. "N" can define the periodicity in symbols of the amble and "M" can define the number of symbols. This assumes that the duration of an amble symbol is the same as a payload symbol. At the beginning of the transmission of an N symbol sequence, the first M symbols are amble symbols, and the remaining N-M symbols are payload symbols. This sequencing can be repeated every N symbol times.

Upon commencing data transmission, M and N are set to a priori determined values, which are the same at the receiver 200 and transmitter 250. Initial signal acquisition can be performed in a standard manner as known to those skilled in the art.

At the receiver 250, amble symbols are separated from payload symbols in a manner consistent with how they are combined at the transmitter 200. In the embodiment shown, because the payload and ambles are time multiplexed, the payload and ambles are time demultiplexed at the intermediate frequency (IF). It should be apparent to those skilled in the art that demultiplexing could be done later in the signal processing.

In the illustrated embodiment, the amble sequence is first acquired and synchronized. The amble could be fixed as a single sequence or could change at each amble time. Information extracted from the amble is compared to a local copy of the amble to extract accurate timing, frequency, and phase tracking data to control amble and payload data tracking loops based on the circuit configuration as illustrated.

In this embodiment, the comparison of the received amble signal with the local version of the amble determines the dynamics of the transmission channel. In other embodiments, it is possible to have information derived from certain signal processing functions on the payload data to supplement the amble extracted information. These channel performance characterizations can be compared to a set of thresholds and algorithms to determine one of the following:

(1) Performance is nominal and therefore do not change N and M;

(2) Performance is too degraded for acceptable operation so M should be increased or N decreased;

(3) Performance is higher than required so M should be decreased or N increased to increase payload throughput;

(4) Performance is too degraded for acceptable operation and N and M have reached extreme values such that the modulation can be changed to some lower throughput and reset N and M accordingly; and (5) Performance is higher than required and N and M have reached their extremes for high performance such that the modulation can be changed to some higher throughput and reset N and M accordingly.

Changes are communicated to the transmitter 200 via a control channel defined by the circuit portion having components 230-240 and 214-220 and synchronized. This control channel is orthogonal to the payload channel. In embodiments in which payload data is unidirectional, a separate control channel can be used. In embodiments in which payload data is bi-directional, control data may be transmitted via a separate control signal or the control data may be embedded as a field in the transmitted payload data stream. Control data may be transmitted using the same modulation format as the payload data or a different modulation format. The modulation and demodulation of amble control data can be accomplished using techniques known to those skilled in the art.

Synchronization of changes in amble characteristics is typically required for proper system performance and may be embodied using different techniques. One embodiment relies on identical counters at the transmitter and receiver and counts the times modulo some integer. The receive side counter bases its count on the recovered symbol timing. Amble update information can be passed anytime during a counter cycle but is only updated at a cycle boundary. The counters are initialized by a preamble at the beginning of a transmission and are synchronized independent of channel delays and any other sources of timing offset.

Another embodiment that does not require initial synchronization uses the presence and detections of ambles to initiate updates. Amble update information could be transmitted anywhere between ambles, either asynchronous with an amble or synchronous to an amble just as the embodiment described in the previous paragraph can transmit amble update information asynchronously or synchronously to some count marker of the counters. Upon verification of the occurrence of the next amble after update information is received, the amble parameters are updated.

Yet another embodiment could update amble parameters based on real time clock states and a determination of the time delay between transmitters and receivers.

When the amble data is time multiplexed with payload data such as in the circuit of FIG. 4, the receiver routes payload data to the payload data demodulation circuit portion illustrated by components 264-270 during payload time slots, and routes ambles to those components for amble demodulation and signal processing during amble time slots. In any time multiplexed embodiments, a payload data "unbuffer" operation using a memory buffer (not shown) may be required to equally space the payload data.

In embodiments using any code division, phase offset, or frequency division multiplexing, the separation of amble and payload signal can be accomplished using appropriate techniques known to those skilled in the art.

An initial amble is routed to an amble acquisition circuit 288 to identify the presence of an initial amble and extract any information required to initialize affected parameters of the receiver 250. Thereafter, the amble is detected and demodulated, such as within the demodulator 284, at intervals defined by the amble control data.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for communicating, comprising:
a transmitter comprising,
an encoder and baseband modulator that encodes and modulates a sequence of payload data symbols as a signal constellation to be communicated;
an amble generator and baseband modulator that generates amble symbols as a known sequence of M symbol times in length, every N symbol times, wherein N defines the periodicity in symbols of the amble and M defines the number of symbols;
a multiplexer that multiplexes the data and amble symbols together to form a communications signal that is transmitted over a communications channel; and
a receiver that receives the communications signal and separates the data symbols from the amble symbols and determines performance metrics such that said transmitter either increases or decreases at least one of the length of the amble or frequency of ambles to bring a performance metric above or below a threshold without changing a symbol rate.

2. The system according to claim 1, wherein said multiplexer comprises a time division multiplexer for time multiplexing the data and amble symbols together.

3. The system according to claim 1, wherein said amble symbols comprise either a different modulation format than the data symbols or a subset of the data symbols.

4. The system according to claim 1, wherein the duration of an amble symbol is the same as a data symbol.

5. The system according to claim 1, wherein the transmitter is operative for transmitting the communications signal such that at the beginning of a transmission of an N symbol sequence the first M symbols are amble symbols and the remaining N-M symbols are data symbols.

6. The system according to claim 1, and further comprising a control channel between the transmitter and receiver that is orthogonal to the communications channel.

7. The system according to claim 1, wherein said receiver further comprises an amble generator for generating a local version of the amble symbols and comparing with received amble symbols to determine dynamics of the communications channel to determine performance metrics of the communications channel.

8. The system according to claim 1, and further comprising a control channel for transmitting control data.

9. An apparatus for transmitting a communications signal, comprising:
an encoder and baseband modulator that encodes and modulates a sequence of payload data symbols as a signal constellation to be communicated;

an amble generator and baseband modulator that generates amble symbols as a known sequence of M symbol times in length, every N symbol times, wherein N defines the periodicity in symbols of the amble and M defines the number of symbols; and a multiplexer that multiplexes the data and amble symbols together to form a communications signal that is transmitted over a communications channel such that at least one of the length of the amble or frequency of ambles are decreased or increased to bring a performance metric above or below a given threshold without changing a symbol rate.

10. The apparatus according to claim 9, wherein said multiplexer comprises a time division multiplexer for time multiplexing the data symbols and amble symbols together.

11. The apparatus according to claim 9, wherein said amble symbols comprise either a different modulation format than the data symbols or a subset of the data symbols.

12. The apparatus according to claim 9, wherein the duration of an amble symbol is the same as a data symbol.

13. The apparatus according to claim 9, wherein communications signal are transmitted such that at the beginning of a transmission of an N symbol sequence the first M symbols are amble symbols and the remaining N-M symbols are data symbols.

14. The apparatus according to claim 9, and further comprising a control channel for transmitting control data.

15. A method for communicating, which comprises:

generating within an encoder an encoded sequence of payload data symbols as a signal constellation to be communicated;

multiplexing the sequence of data symbols with amble symbols as a known training sequence of M symbol times in length, every N symbol times to form a communications signal that is transmitted along a communications channel, wherein N defines the periodicity in symbols of the amble and M defines the number of symbols; and either increasing or decreasing at least one of the length of the amble or frequency of ambles based on monitored performance metrics of the communications channel to bring a performance metric above or below a given threshold without changing a symbol rate.

16. The method according to claim 15, which further comprises time multiplexing the sequence of data symbols and amble symbols.

17. The method according to claim 15, which further comprises generating amble symbols with a different modulation format than the data symbols or as a subset of the data symbols.

18. The method according to claim 15, wherein the duration of an amble symbol is the same as a data symbol.

19. The method according to claim 15, which further comprises transmitting the communications signal such that at the beginning of a transmission of an N symbol sequence the first M symbols are amble symbols and the remaining N-M symbols are data symbols.

20. The method according to claim 15, which further comprises transmitting performance metrics along a control channel that is orthogonal to the communications channel.

21. The method according to claim 15, which further comprises receiving the communications signal within a receiver and separating the data symbols from the amble symbols.

22. The method according to claim 21, which further comprises generating a local version of the amble symbols at the receiver and comparing with received amble symbols to determine dynamics of the communications channel to determine performance metrics of the communications channel.

23. The method according to claim 15, which further comprises counting recovered symbols at both a transmitter and receiver for synchronizing changes in amble characteristics.

24. The method according to claim 15, which further comprises embedding control data within payload data to be transmitted.

25. The method according to claim 15, which further comprises monitoring at least one of a signal-to-noise ratio, bit error rate (BER) and packet error rate (PER) as performance metrics.

26. The method according to claim 15, which further comprises encoding the sequence of data signals with a Forward Error Correction (FEC) code.

27. The method according to claim 15, which further comprises baseband modulating the sequence of data symbols.

28. The method according to claim 15, which further comprises transmitting control data along a control channel.

* * * * *